US010103646B2

(12) United States Patent
Hayashi et al.

(10) Patent No.: US 10,103,646 B2
(45) Date of Patent: Oct. 16, 2018

(54) CONTROL DEVICE FOR POWER CONVERTER

(71) Applicant: DENSO CORPORATION, Kariya, Aichi-pref. (JP)

(72) Inventors: Yoshinori Hayashi, Kariya (JP); Tomotaka Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/274,467

(22) Filed: Sep. 23, 2016

(65) Prior Publication Data

US 2017/0093303 A1    Mar. 30, 2017

(30) Foreign Application Priority Data

Sep. 24, 2015  (JP) .................................. 2015-186455
Sep. 12, 2016  (JP) .................................. 2016-177958

(51) Int. Cl.
| | |
|---|---|
| *H02M 7/5387* | (2007.01) |
| *H02M 3/158* | (2006.01) |
| *H02M 1/088* | (2006.01) |
| *H02M 1/00* | (2006.01) |

(52) U.S. Cl.
CPC ....... *H02M 7/53871* (2013.01); *H02M 1/088* (2013.01); *H02M 3/158* (2013.01); *H02M 2001/0032* (2013.01); *H02M 2001/0054* (2013.01); *Y02B 70/1491* (2013.01); *Y02B 70/16* (2013.01)

(58) Field of Classification Search
CPC ......... H02M 1/088; H02M 2001/0032; H02M 2001/0054; H02M 3/158; H02M 7/53871
See application file for complete search history.

(56) References Cited

U.S. PATENT DOCUMENTS

| | | | | |
|---|---|---|---|---|
| 6,140,620 A | * | 10/2000 | Aldridge ................... | F24C 7/08 219/414 |
| 2009/0237045 A1 | * | 9/2009 | Dishman ............. | H02M 3/3376 323/271 |
| 2010/0079192 A1 | * | 4/2010 | Strzalkowski .... | H02M 7/53803 327/419 |
| 2016/0134148 A1 | * | 5/2016 | Ide ........................ | H02M 3/158 307/52 |
| 2017/0005585 A1 | * | 1/2017 | Shimura ........... | H02M 3/33569 |

FOREIGN PATENT DOCUMENTS

JP         2011-015562 A      1/2011

* cited by examiner

*Primary Examiner* — Adolf Berhane
*Assistant Examiner* — Bart Iliya
(74) *Attorney, Agent, or Firm* — Oliff PLC

(57) ABSTRACT

In a control device, a load determiner determines whether a power converter is in a high-load state or a low-load state. A high-load controller controls on-off operations of the first rectifiers such that on durations of the first rectifiers are respectively synchronized with each other when it is determined that the power converter is in the high-load state. A low-load controller controls on-off operations of the first rectifiers to reduce the on durations of the first rectifies synchronized with each other when it is determined that the power converter is in the low-load state.

10 Claims, 12 Drawing Sheets

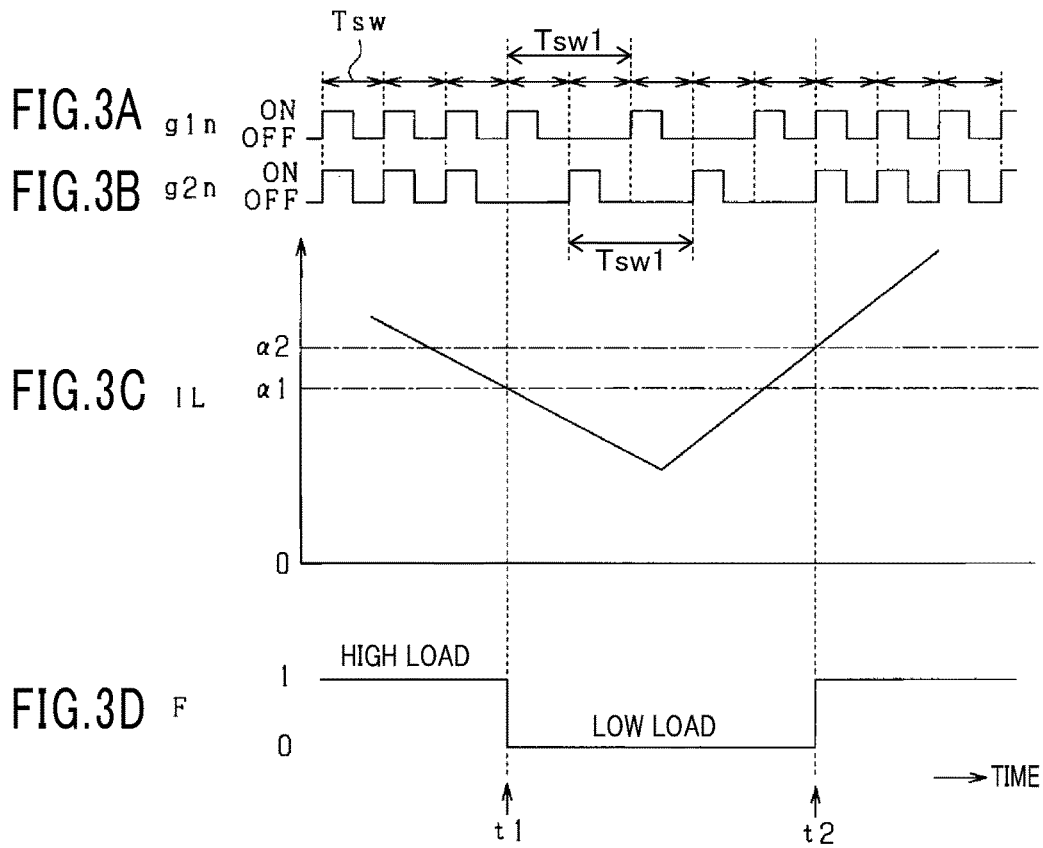
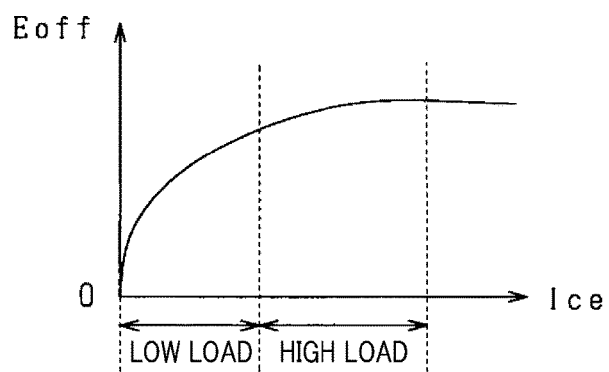
FIG. 4

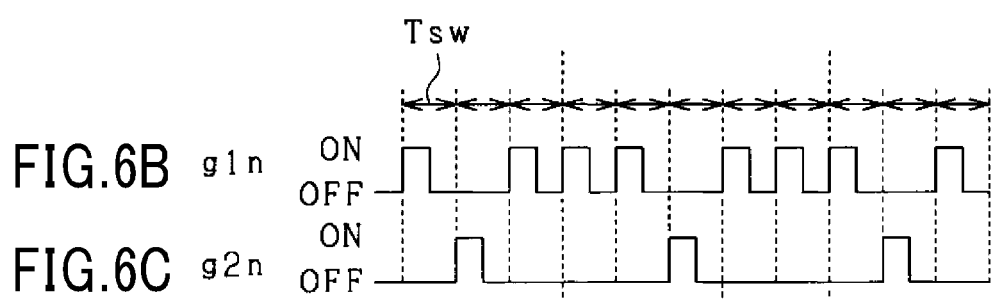
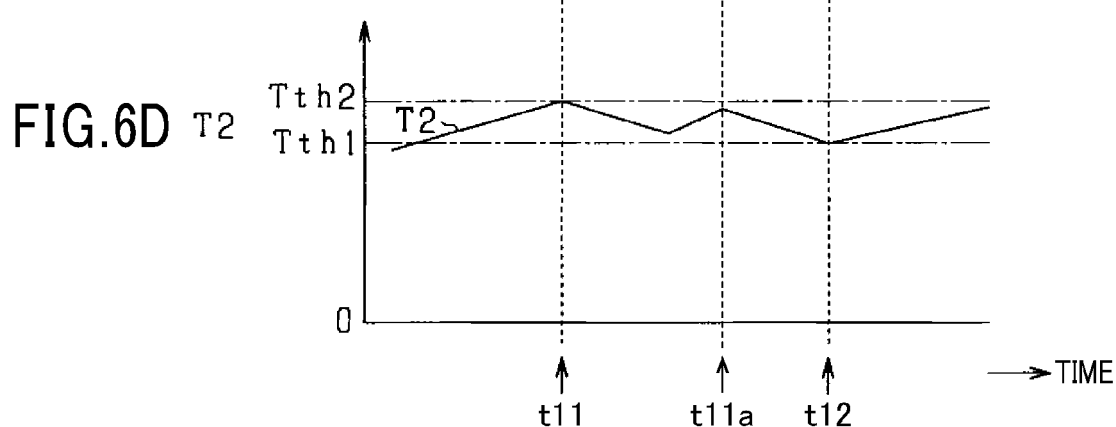

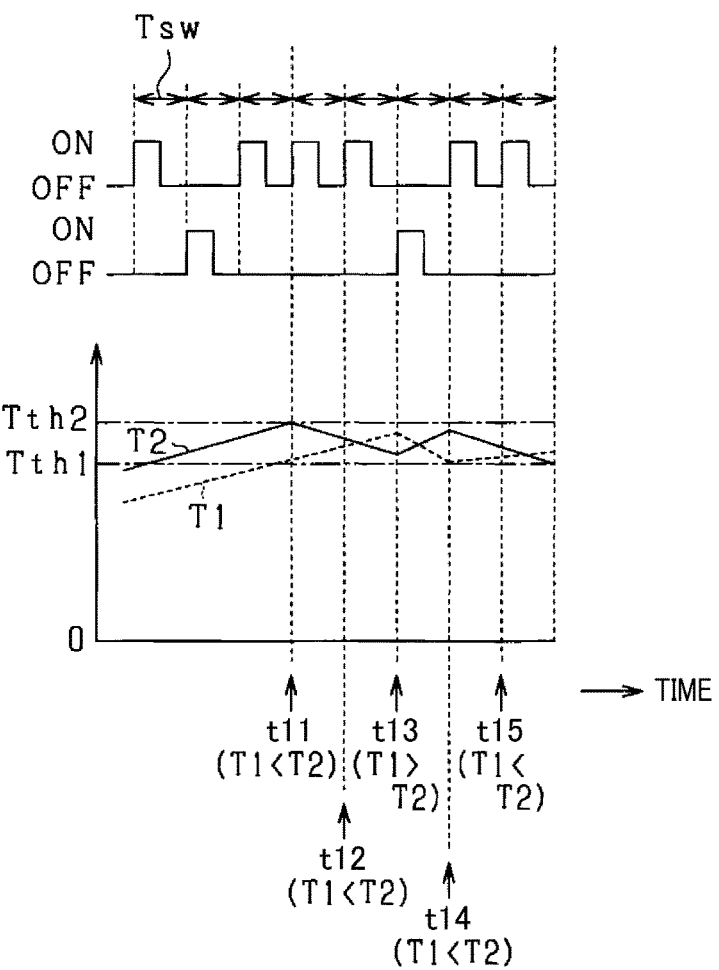

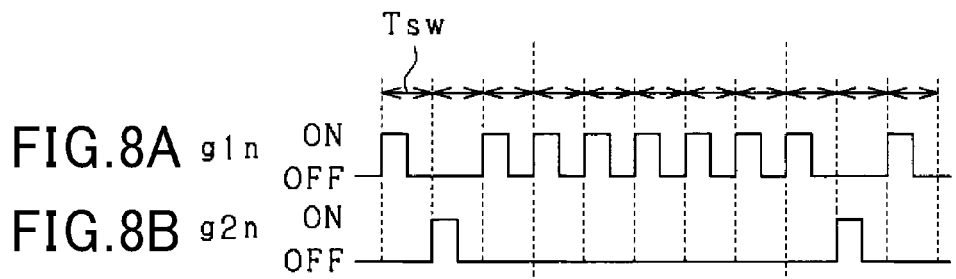
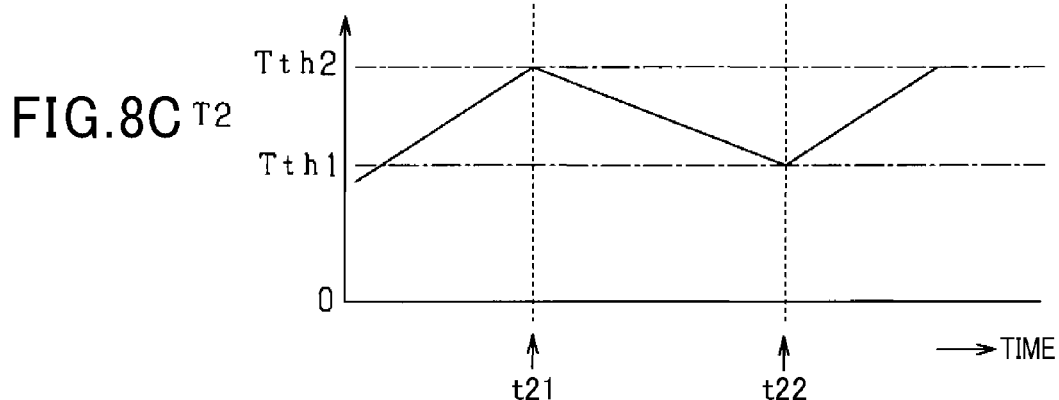
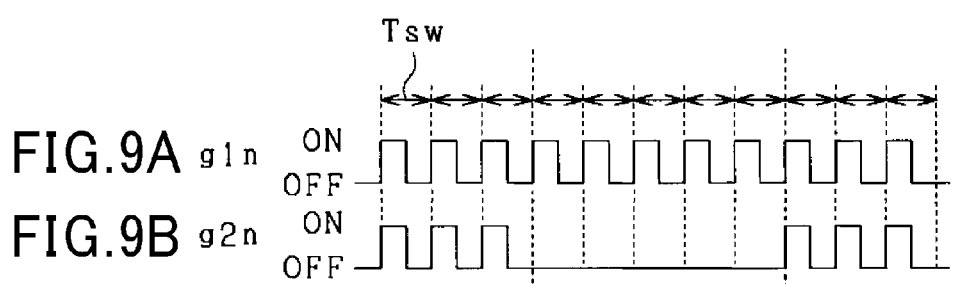
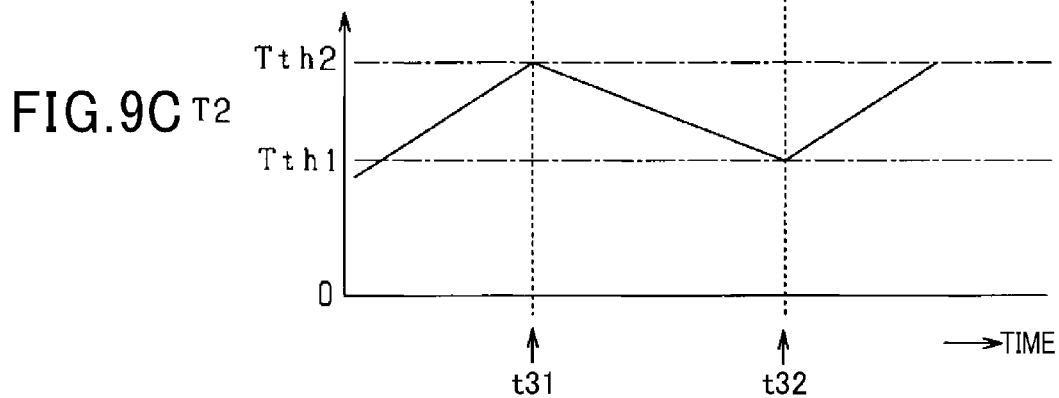

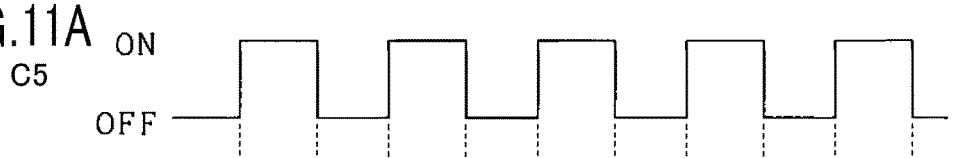
FIG.11A C5
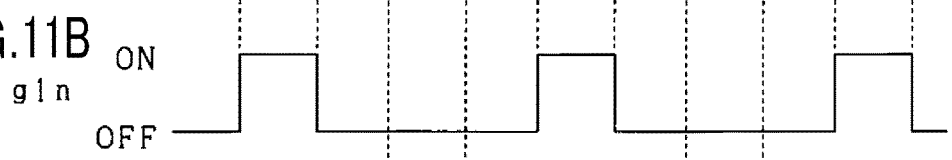
FIG.11B g1n
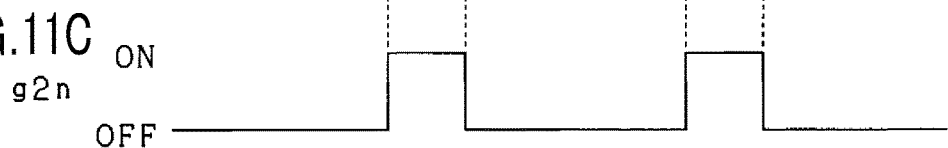
FIG.11C g2n
→ TIME
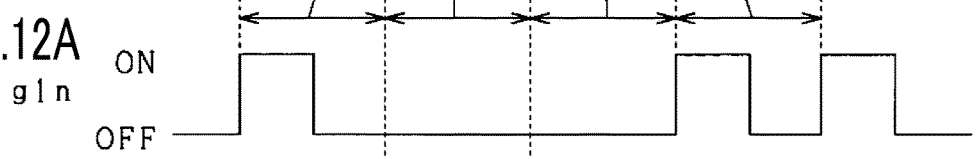
FIG.12A g1n
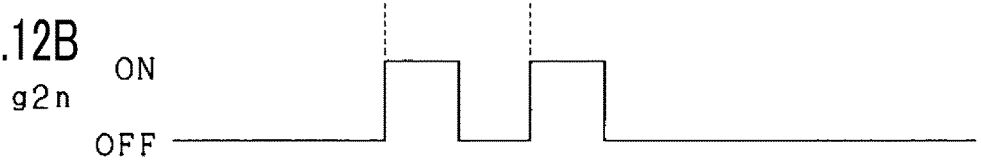
FIG.12B g2n
→ TIME

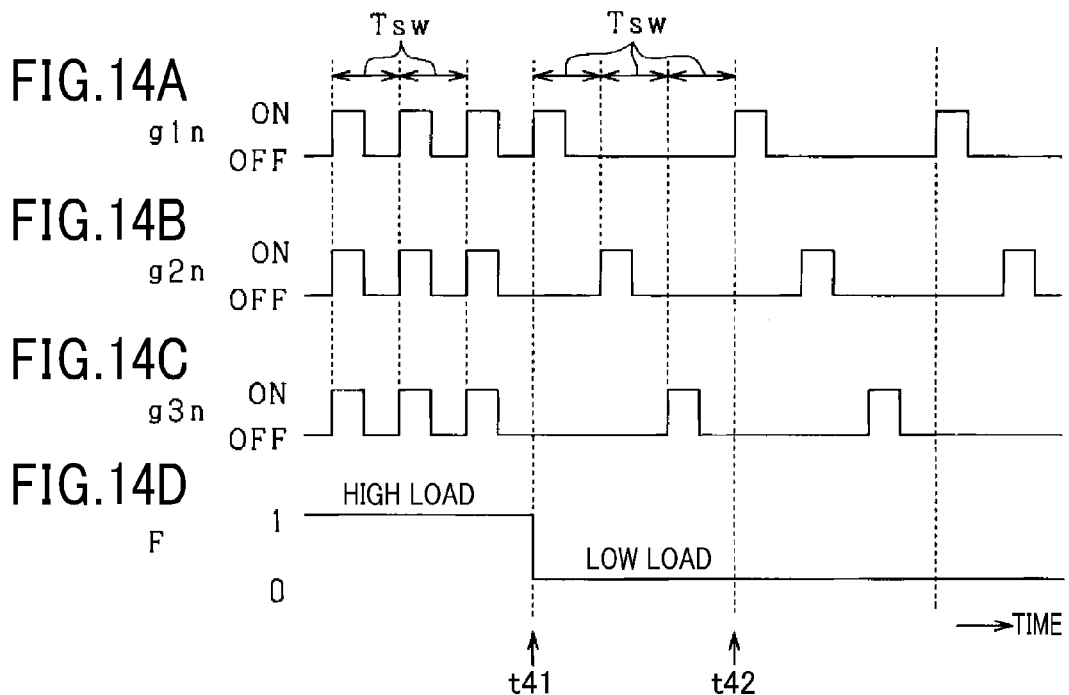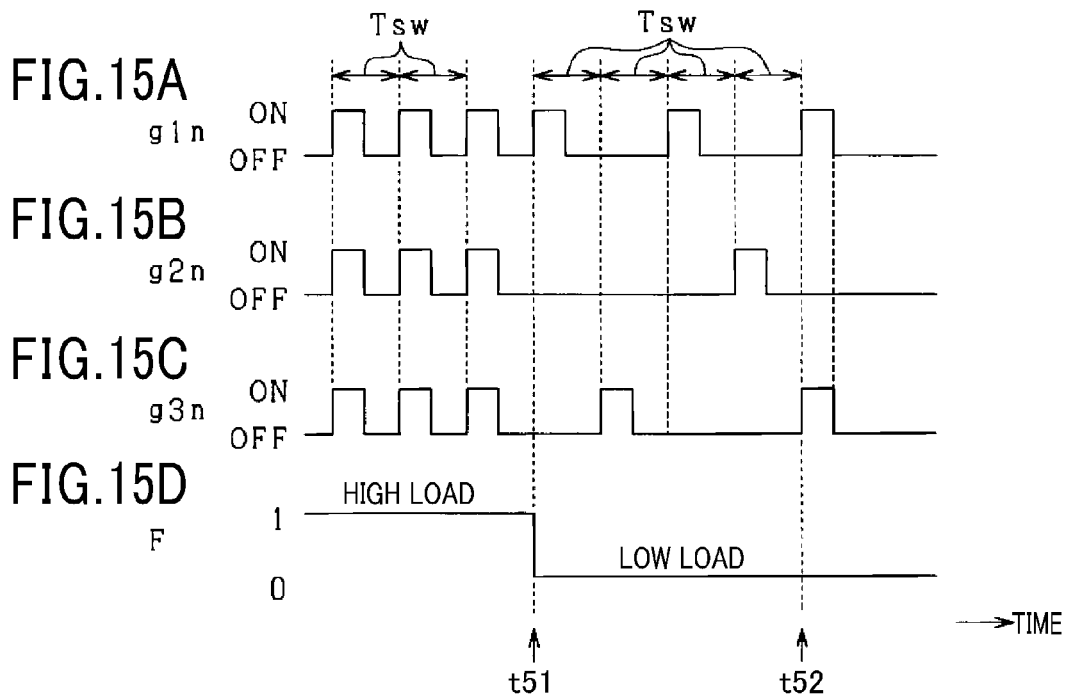

CONTROL DEVICE FOR POWER CONVERTER

CROSS REFERENCE TO RELATED APPLICATION

This application is based on and claims the benefit of priority from Japanese Patent Application No. 2015-186455 filed on Sep. 24, 2015, and No. 2016-177958 filed on Sep. 12, 2016, the disclosure of which is incorporated in its entirety herein by reference.

TECHNICAL FIELD

The present disclosure relates to control devices for a power converter.

BACKGROUND

Typical voltage converters convert an input voltage into an output voltage while the input voltage is different in level from the output voltage.

For example, Japanese Patent Application Publication No. 2011-15562, which will be referred to as a known patent document, discloses a power supply source including such a voltage converter. The voltage converter of the power supply source of the known patent document includes a first power supply unit and a second power supply unit; the first and second power supply units are connected in parallel to each other.

Each of the first and second power supply units has a function of converting an input voltage to a controlled output voltage, which is supplied to at least one electrical load.

The voltage converter of the known patent document is configured to determine how to drive the first and second power supply units depending on power required for the at least one electrical load.

Specifically, the voltage converter of the known patent document drives both the first and second power supply units when the voltage converter is in a high-load state. The voltage converter being in the high-load state means that the voltage converter should output, to at least one electrical load connected thereto, power that is not less than a predetermined level. In contrast, the voltage converter of the known patent document drives only the first power supply unit when the voltage converter is in a low-load state. The voltage converter is in the low-load state represents that the voltage converter should output, to at least one electrical load connected thereto, power that is less than the predetermined level.

The voltage converter of the known patent document aims to reduce power consumption loss of the voltage converter when the voltage converter is in the low-load state.

SUMMARY

Voltage converters include, in addition to the voltage converter disclosed in the known patent document, voltage converters for boosting an input voltage and outputting a boosted voltage to at least one electrical load. Users of such voltage converters have a desire to provide control devices for controlling such a voltage converter to reduce power consumption loss of the voltage converter when the voltage converter is in such a low-load state.

The present disclosure in view of the above circumstances aims to provide control devices of a voltage converter for at least one electrical load, each of which is capable of reducing power consumption loss of the voltage converter when the voltage converter is in a low-load state.

According to an exemplary aspect of the present disclosure, there is provided a control device for a power converter including a first set of a plurality of first rectifies and a second set of a plurality of second rectifies connected to the respective first rectifies in series. At least each of the first rectifies of the first set being comprised of a switch. The control device is configured to control on-off operations of the first rectifiers to convert power input to the power converter from a direct-current power source into controlled power as output power from the power converter to an electrical load. The control device includes a load determiner configured to determine whether the power converter is in a high-load state or a low-load state. The high-load state represents a state of the power converter where the output power from the power converter is not less than a predetermined level. The low-load state of the power converter represents a state of the power converter where the output power from the power converter being in the low-load state is less than the output power from the power converter being in the high-load state. The control device includes a high-load controller configured to control on-off operations of the first rectifiers such that on durations of the first rectifiers are respectively synchronized with each other when it is determined that the power converter is in the high-load state. The control device includes a low-load controller. The low-load controller is configured to control on-off operations of the first rectifiers to reduce the on durations of the first rectifies synchronized with each other when it is determined that the power converter is in the low-load state.

The high-load controller of the control device according to the exemplary aspect controls on-off operations of the first rectifiers such that on durations of the first rectifiers are respectively synchronized with each other when it is determined that the power converter is in the high-load state. This enables a current flowing from the direct-current power source to the inductor to be divided into the first rectifiers. This enables the reliability of each of the first switches to be maintained when the power converter is in the high-load state.

A current flowing from the direct-current source to the inductor when the power converter is determined to be in the low-load state is lower than a current flowing from the direct-current source to the inductor when the power converter is determined to be in the high-load state. For this reason, even if the current flowing from the direct-current source to the inductor is concentrically supplied to at least one of the first rectifiers when the power converter is determined to be in the low-load state, it is possible to prevent reduction in the reliability of the at least one of the first rectifiers.

In view of these circumstances, the low-load controller controls on-off operations of the first rectifiers to reduce the on durations of the first rectifies synchronized with each other when it is determined that the power converter is in the low-load state.

This results in reduction of power consumption loss of the first rectifies while the power converter is in the low-load state.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of an embodiment with reference to the accompanying drawings in which:

FIGS. 3A to 3D is a joint timing chart schematically illustrating how a voltage booster illustrated in FIG. 1 is controlled based on the switching control routine illustrated in FIG. 2 according to the first embodiment;

FIG. 4 is a graph schematically illustrating an example of the relationship between low due to tail current and collector current according to the first embodiment;

FIGS. 6B to 6D is a joint timing chart schematically illustrating how a voltage booster illustrated in FIG. 5 is controlled based on the switching control routine illustrated in FIGS. 2 and 6A according to the second embodiment;

FIG. 7A to 7C is a joint timing chart schematically illustrating how the voltage booster illustrated in FIG. 5 is controlled based on the switching control routine illustrated in FIGS. 2 and 6A according to the second embodiment;

FIGS. 8A to 8C is a joint timing chart schematically illustrating how a voltage booster according to the third embodiment is controlled based on the switching control routine illustrated in FIGS. 2 and 6A during execution of low-load switching control;

FIGS. 9A to 9C is a joint timing chart schematically illustrating how a voltage booster according to the third embodiment is controlled based on the switching control routine illustrated in FIGS. 2 and 6A during execution of high-load switching control;

FIGS. 11A to 11C is a joint timing chart schematically illustrating how a common command signal output from an ECU illustrated in FIG. 10 and drive signals output from first and second drive units illustrated in FIG. 10 change;

FIGS. 12A and 12B is a joint timing chart schematically illustrating how the voltage booster according to the first embodiment is controlled according to a modification of the first embodiment;

FIGS. 14A to 14D is a joint timing chart schematically illustrating an example of switching control of first to third lower-arm switches of a voltage booster of the power control system illustrated in FIG. 13; and FIGS. 15A to 15D is a joint timing chart schematically illustrating an example of switching control of the first to third lower-arm switches of the voltage booster illustrated in FIG. 13.

DETAILED DESCRIPTION OF EMBODIMENT

Figure 1:
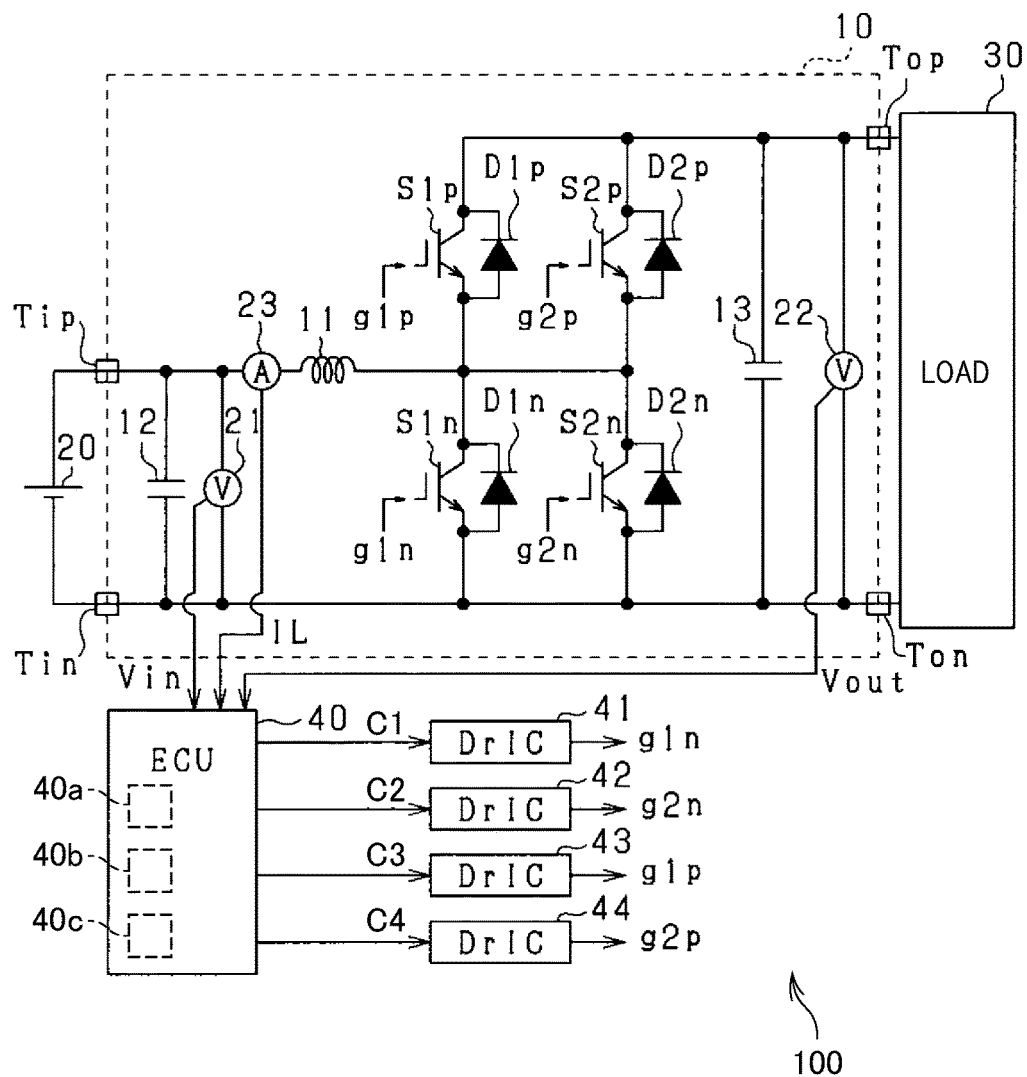
FIG. 1 is a circuit diagram schematically illustrating an example of the overall structure of a power control system according to the first embodiment of the present disclosure.

The following describes embodiments of the present disclosure with reference to the accompanying drawings. In the drawings, identical reference characters are utilized to identify identical corresponding components.

FIG. 1 illustrates a voltage booster, which is an example of power converters, 10 and a control system 100 for controlling the voltage booster 10.

The voltage booster 10 is designed as, for example, a chopper booster, and operative to boost an output voltage from a direct-current (DC) power source, such as a battery, 20, and output the boosted voltage to at least one electrical load, such as an inverter, 30. The DC power source 20 has opposition positive and negative terminals.

The voltage booster 10 has a positive input terminal Tip, a negative input terminal Tin, a positive output terminal Top, and a negative output terminal Ton. The voltage booster 10 includes, for example, an inductor, i.e. a reactor, 11 and a first capacitor 12. The inductor 11 has opposing first and second ends, and the first capacitor 12 has opposing first and second electrodes, i.e. first and second ends.

The first end of the inductor 11 is connected to the positive terminal of the DC power source 20 via the positive input terminal Tip. The first electrode of the first capacitor 12 is connected to the positive input terminal Tip, and the second electrode of the first capacitor 12 is connected to the negative terminal of the DC power source 20 via the negative input terminal Tin. This results in the first capacitor 12 being connected in parallel to the DC power source 20.

The voltage booster 10 includes a first pair of a first upper-arm switch S1$p$ and a first lower-arm switch S1$n$ connected in series to each other. The voltage booster 10 also includes a second pair of a second upper-arm switch S2$p$ and a second lower-arm switch S2$n$ connected in series to each other. The voltage booster 10 further includes free-wheel diodes or flywheel diodes D1$p$, D1$n$, D2$p$, and D2$n$ connected in antiparallel to the respective switches S1$p$, S1$n$, S2$p$, and S2$n$.

In other words, the voltage booster 10 includes a first set of a plurality of first rectifiers S1$n$ and S2$n$ each comprised of a switch, and a second set of a plurality of second rectifiers S1$p$ and S2$p$ connected to the respective first rectifies S1$n$ and S2$n$ in series.

Specifically, the flywheel diode D1$p$, which will be referred to as a first upper-arm diode, D1$p$ is connected in antiparallel to the first upper-arm switch S1$p$, and the flywheel diode D1$n$, which will be referred to as a first lower-arm diode, D1$n$ is connected in antiparallel to the first lower-arm switch S1$n$. Similarly, the flywheel diode D2$p$, which will be referred to as a second upper-arm diode D2$p$, is connected in antiparallel to the second upper-arm switch S2$p$, and the flywheel diode D2$n$, which will be referred to as a second lower-arm diode D2$n$, is connected in antiparallel to the second lower-arm switch S2$n$.

Each of the first and second upper-arm diodes D1$p$ and D2$p$ according to the first embodiment serves as, for example, an upper-arm rectifier.

For example, the first embodiment uses IGBTs, as an example of voltage-controlled switches, as the upper- and lower-arm switches D1$p$, D1$n$, D2$p$, and D2$n$. MOSFETs or bipolar transistors can also be used as the upper- and lower-arm switches D1$p$, D1$n$, D2$p$, and D2$n$. If MOSFETs are individually used as the upper- and lower-arm switches D1$p$, D1$n$, D2$p$, and D2$n$, intrinsic diodes of the MOSFETs can be used as the flywheel diodes.

The connection point between the first upper- and lower-arm switches S1$p$ and S1$n$ is connected to the second end of the inductor 11. Similarly, the connection point between the second upper- and lower-arm switches S2$p$ and S2$n$ is connected to the second end of the inductor 11.

The collectors of the first and second upper-arm switches S1$p$ and S2$p$ are connected to the positive output terminal Top of the voltage booster 10. The emitters of the first and second lower-arm switches S1$n$ and S2$n$ are connected to the negative output terminal Ton of the voltage booster 10.

The at least one electrical load 30 is connected to the positive and negative output terminals Top and Ton of the voltage booster 10 such that the voltage boosted by the voltage booster 10 is supplied to the at least one electrical load 30. The first embodiment uses an inverter as an example of electrical loads; the inverter converts the DC voltage boosted by the voltage booster 10 into an alternating-current (AC) voltage, and outputs the AC voltage to, for example, an unillustrated motor connected thereto. The unillustrated motor is driven based on the AC voltage to output torque.

The control system 100 includes an input voltage sensor 21, an output voltage sensor 22, a current sensor 23, and an electronic control unit (ECU) 40.

The input voltage sensor 21 is connected across the first capacitor 12 to serve as an input voltage measuring unit. Specifically, the input voltage sensor 21 is operative to measure the voltage across the first and second electrodes of the first capacitor 12 as an input voltage Vin to the voltage booster 10. The input voltage sensor 21 is connected to the ECU 40, and outputs the measured input voltage Vin to the ECU 40.

The output voltage sensor 22 is connected across the second capacitor 13 to serve as an output voltage measuring unit. Specifically, the output voltage sensor 22 is operative to measure the voltage across the first and second electrodes of the second capacitor 13 as an output voltage Vout of the voltage booster 10. The output voltage sensor 22 is connected to the ECU 40, and outputs the measured output voltage Vout to the ECU 40. The current sensor 23 is mounted on, for example, the connection line connecting between the positive input terminal Tip and the first end of the inductor 11 to serve as a current measuring unit. Specifically, the current sensor 23 is operative to measure a current flowing through the inductor 11 as an inductor current IL.

The ECU 40 is connected to the input voltage sensor 21, the output voltage sensor 22, and the current sensor 23. The ECU 40 receives the input voltage Vin of the voltage booster 10 measured by the input voltage sensor 21, the output voltage Vout of the voltage booster 10 measured by the output voltage sensor 22, and the inductor current IL measured by the current sensor 23.

The ECU 40 performs feedback control of the output voltage Vout of the voltage booster 10 based on on-off control of the first and second lower-arm switches S1$n$ and S2$n$. This causes the output voltage Vout of the voltage booster 10 to follow a target voltage Vtgt.

Specifically, the ECU 40 determines the duty Duty of each of the first and second lower-arm switches S1$n$ and S2$n$ as a function of the input voltage Vin, the output voltage Vout, and the inductor current IL when controlling the voltage booster 10 to operate in a booster mode, i.e. a step-up mode. The duty Duty of each of the switches S1$n$ and S2$n$ represents the ratio of on duration Ta to the total duration of each switching cycle Tsw or Tsw1 for a corresponding one of the switches S1$n$ and S2$n$; the duty Duty is expressed as Ta/Tsw or Ta/Tsw1. The difference between the switching cycles Tsw and Tsw1 will be described later. More specifically, the ECU 40 increases the duty Duty of each of the first and second lower-arm switches S1$n$ and S2$n$ with an increase of the target voltage Vtgt.

The power control system 100 also includes first, second, third, and fourth drivers 41 to 44 provided for the first lower-am switch S1$n$, the second lower-arm switch 42, the first upper-arm switch S1$p$, and the second upper-arm switch S2$p$. Each of the first to fourth drivers 41 to 44 is comprised of an integrated circuit (IC). In FIG. 1, labels DrIC are assigned to the respective first to fourth drivers 41 to 44.

The ECU 40 is essentially comprised of a microcomputer circuit including, for example, a CPU, a ROM, a RAM, and other known peripheral devices. The microcomputer circuit of the ECU 40 runs software programs to perform various tasks.

Specifically, the ECU 40 generates command signals C1, C2, C3, and C4 for the respective switches S1$n$, S2$n$, S1$p$, and S2$p$ based on the determined duty Duty of each of the first and second lower-arm switches S1$n$ and S2$n$. Then, the ECU 40 outputs the command signals C1 to C4 to the respective first to fourth drivers 41 to 44.

The first driver 41 generates a drive signal g1$n$ based on the command signal C1, and outputs the drive signal g1$n$ to the first lower-arm switch S1$n$, thus controlling on-off operations of the first lower-arm switch S1$n$.

The second driver 42 generates a drive signal g2$n$ based on the command signal C2, and outputs the drive signal g2$n$ to the second lower-arm switch S2$n$, thus controlling on-off operations of the second lower-arm switch S2$n$.

The third driver 43 generates a drive signal g1$p$ based on the command signal C3, and outputs the drive signal g1$p$ to the first upper-arm switch S1$p$, thus controlling on-off operations of the first upper-arm switch S1$p$.

The fourth driver 44 generates a drive signal g2$p$ based on the command signal C4, and outputs the drive signal g2$p$ to the second upper-arm switch S2$p$, thus controlling on-off operations of the second upper-arm switch S2$p$.

In particular, each of the third and fourth drivers 43 and 44 according to the first embodiment causes a corresponding one of the first and second upper-arm switches S1$p$ and S2$p$ to be maintained off when the voltage booster 10 is controlled to operate in the booster mode.

Additionally, the ECU 40 causes the voltage booster 10 to serve as a step-down converter based on on-off control of the first and second upper-arm switches S1$p$ and S2$p$.

Specifically, the ECU 40 determines the duty Duty of each of the first and second upper-arm switches S1$p$ and S2$p$ as a function of the input voltage Vin, the output voltage Vout, and the inductor current IL when controlling the voltage booster 10 to operate in a step-down mode.

Then, the ECU 40 controls on-off operations of each of the first and second upper-arm switches S1$p$ and S2$p$ according to the corresponding determined duty Duty. This steps down a voltage input to the voltage booster from the second capacitor 13, and outputs the reduced voltage to the first capacitor 12. For example, the ECU 40 causes the voltage booster 10 in the step-down mode when electrical power is supplied from the at least one electrical load 30 to the DC power source 20 in a regenerative mode of the at least one electrical load 30.

In addition, the ECU 40 functionally includes a load determiner 40a that determines whether the voltage booster 10 is in a high-load state or a low-load state according to, for example, the inductor current IL.

Note that the high-load state of the voltage booster 10 represents, for example, that (1) Power that should be output by the voltage booster 10 in the step-up mode to the at least one electrical load 30 is not less than a predetermined level or (2) Power that is supplied from the at least one electrical load 30 to the voltage booster 10 in the step-down mode is not less than the predetermined level.

That is, the high-load state of the voltage booster 10 represents, for example, that power transferred between the voltage booster 10 and the at least one electrical load 30 is not less than the predetermined level.

The low-load state of the voltage booster 10 represents, for example, that power that should be output from the voltage booster 10 to the at least one electrical load 30 or should be supplied from the at least one electrical load 30 to the voltage booster 10 is less than the power output from or supplied to the voltage booster 10 being in the high-load state. Specifically, power output from or supplied to the voltage booster 10 being in the low-load state is less than the predetermined level.

The ECU 40 also functionally includes a high-load controller 40b and a low-load controller 40c. The high-load controller 40b controls on-off operations of each of the first and second lower-arm switches S1$n$ and S2$n$ when the load determiner 40a determines that the voltage booster 10 is in the high-load state. The low-load controller 40c controls on-off operations of each of the first and second lower-arm switches S1$n$ and S2$n$ when the load determiner 40a determines that the voltage booster 10 is in the low-load state.

That is, the ECU 40 performs a switching control routine according to the first embodiment to change the on-off operations of each of the first and second lower-arm switches S1$n$ and S2$n$ in accordance with whether the state of the voltage booster 10 is determined to be in the high-load state or the low-load state.

The following describes the switching control routine carried out by the ECU 40 at, for example, predetermined periods.

When executing the switching control routine, the ECU 40 determines whether a predetermined determination flag F is set to 1 in step S10. Note that the determination flag F is, for example, a bit having a logical low value, represented by 0, or a logical high value, represented by 1, and the initial value of the determination flag F is set to 0. The determination flag F, which is set to 0, represents that the voltage booster 10 is in the low-load state, and the determination flag F, which is set to 1, represents that the voltage booster 10 is in the high-load state.

Upon determining that the determination flag F is set to 1 (YES in step S10), the ECU 40 determines that the voltage booster 10 is in the high-load state. Then, the ECU 40 determines whether the inductor current IL measured by the current sensor 23 is equal to or lower than a predetermined first threshold value $\alpha1$ in step S11. The operation in step S11 aims to determine whether the present state of the voltage booster 10 is likely to shift from the high-load state to the low-load state. That is, the operation in step S11 serves as, for example, the load determiner 40a.

Upon determining that the inductor current IL is higher than the first threshold value $\alpha1$ (NO in step S11), the ECU 40 maintains the determination flag F to 1 in step S12, and thereafter the switching control routine proceeds to step S13.

In step S13, the ECU 40 serves as, for example, the high-load controller 40b to perform high-load switching control. The high-load switching control causes each of the first and second drivers 41 and 42 to perform on-off operations of a corresponding one of the first and second lower-arm switches S1$n$ and S2$n$ while synchronizing the on-duration of the first lower-arm switch S1$n$ with the on-duration of the second lower-arm switch S2$n$ for each switching cycle Tsw.

The operation in step S13 divides the current, i.e. the inductor current IL, flowing from the DC power source 20 to the inductor 11 equally into a first current for the first lower-arm switch S1$n$ and a second current for the second lower-arm switch S2$n$. This enables the reliability of each of the first and second lower-arm switches S1$n$ and S2$n$ to be maintained when the voltage booster 10 is in the high-load state.

Otherwise, upon determining that the inductor current IL is equal to or lower than the first threshold value $\alpha1$ (YES in step S11), the ECU 40 determines that the present state of the voltage booster 10 is likely to shift from the high-load state to the low-load state. Then, the ECU 40 sets the determination flag F to 0 in step S14, and thereafter the switching control routine proceeds to step S15.

In step S15, the ECU 40 serves as, for example, the low-load controller 40c to perform low-load switching control. The low-load switching control causes the first and second drivers 41 and 42 to turn on an alternate one of the first and second lower-arm switches S1$n$ and S2$n$ for each switching cycle Tsw.

That is, the operation of the ECU 40 in step S15 reduces the on durations of the first and second lower-arm switches S1$n$ and S2$n$ synchronized with each other in the high-load switching control.

That is, an actual switching cycle, i.e. a time period, Tsw1 for each of the first and second lower-arm switches S1$n$ and S2$n$ becomes twice the switching cycle Tsw, which will be described in detail later.

When the voltage booster 10 is in the low-load state, the current, i.e. the inductor current IL, flowing from the DC power source 20 to the inductor 11 is lower than the current, i.e. the inductor current IL, flowing from the DC power source 20 to the inductor 11 when the voltage booster 10 is in the high-load state.

The characteristics of the voltage booster 10 being in the low-load state enable the ECU 40 to cause the inductor current IL flowing through the inductor 11 to further flow into any one of the first and second lower-arm switches S1$n$ and S2$n$ while maintaining the reliability of each of the first and second lower-arm switches S1$n$ and S2$n$.

Otherwise, upon determining that the determination flag F is not set to 1, that is, is set to 0 (NO in step S10), the ECU 40 determines that the voltage booster 10 is in the low-load state. Then, the ECU 40 determines whether the inductor current IL measured by the current sensor 23 is equal to or higher than a predetermined second threshold value $\alpha2$ that is higher than the first threshold value $\alpha1$ in step S16. The operation in step S16 aims to determine whether the present state of the voltage booster 10 is likely to shift from the low-load state to the high-load state.

Upon determining that the inductor current IL is lower than the second threshold value $\alpha2$ (NO in step S16), the ECU 40 determines that the low-load state of the voltage booster 10 is maintained. Then, the switching control routine proceeds to step S14 set forth above, and the ECU 40 performs the following operations in steps S14 and S15, thus performing the low-load switching control. Otherwise, upon determining that the inductor current IL is equal to or higher than the second threshold value $\alpha 2$ (YES in step S16), the ECU 40 determines that the state of the voltage booster 10 is likely to shift from the low-load state to the high-load state. Then, the switching control routine proceeds to step S12 set forth above, and the ECU 40 performs the following operations in steps S12 and S13, thus performing the high-load switching control.

Figure 2:
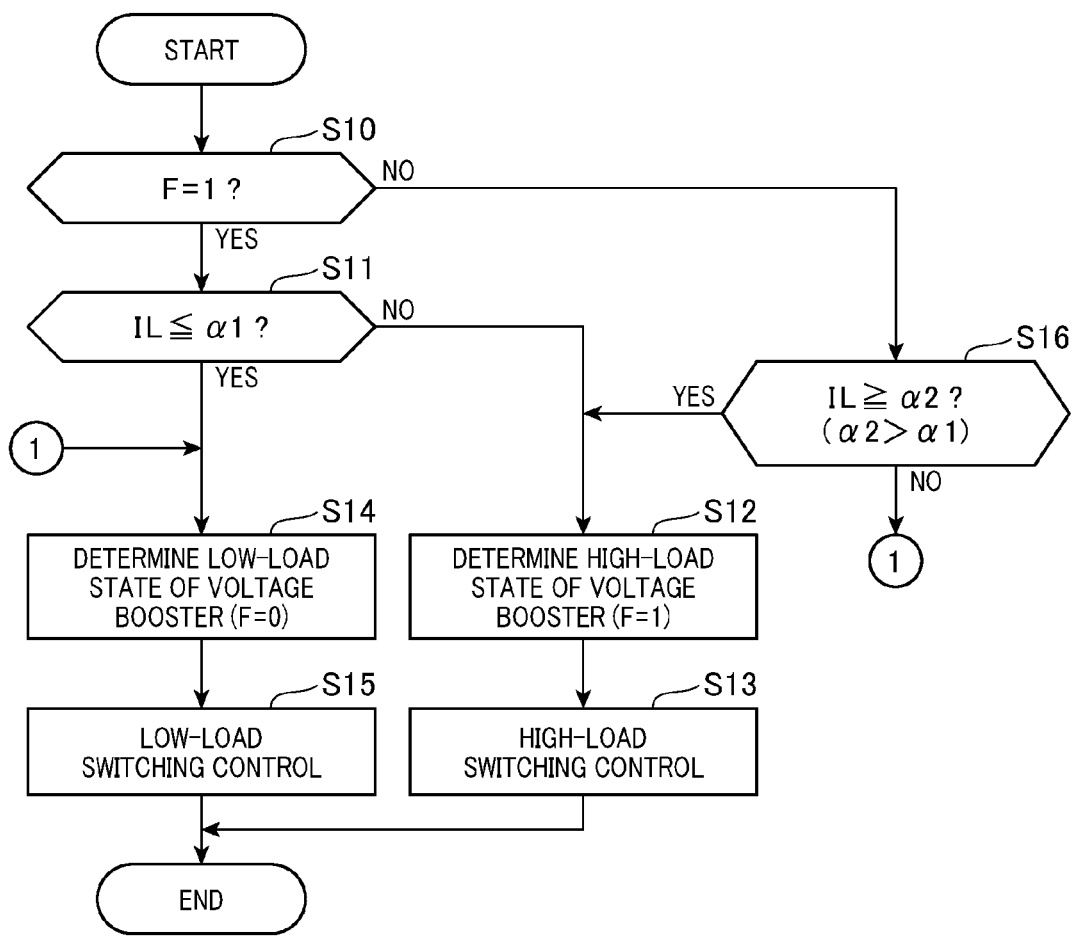
FIG. 2 is a flowchart schematically illustrating an example of a switching control routine carried out by an ECU illustrated in FIG. 1 according to the first embodiment.

FIGS. 3A to 3D schematically illustrate an example of switching control of the first and second lower-arm switches S1$n$ and S2$n$ in accordance with execution of the switching control routine illustrated in FIG. 2 when the voltage booster 10 is operating in the step-up mode.

FIG. 3A illustrates how the drive signal g1$n$ changes, i.e. how the corresponding first lower-arm switch S1$n$ is driven. FIG. 3B illustrates how the drive signal g2$n$ changes, i.e. how the corresponding second lower-arm switch S2$n$ is driven. FIG. 3C illustrates how the inductor current IL changes, and FIG. 3D illustrates how the determination flag F changes. Note that ripples contained in the inductor current IL are ignored in FIG. 3C.

The example of the switching control illustrated in FIGS. 3A to 3D shows that the high-load switching control is carried out before time t1. That is, before the time t1, the first and second lower-arm switches S1$n$ and S2$n$ are controlled to be turned on or off while the turn-on timing and the turn-off timing of the first lower-arm switch S1$n$ are synchronized with the respective turn-on timing and the turn-off timing of the second lower-arm switch S2$n$ (see step S13).

At the time t1, FIG. 3C shows that the inductor current IL decreases to be equal to or lower than the first threshold value $\alpha 1$. Thus, it is determined that the inductor current IL is equal to or lower than the first threshold value $\alpha 1$ at the time t1 (see YES in step S11), so that the determination flag F is switched from 1 to 0 (see step S14). This leads to starting the low-load switching control (see step S15).

Specifically, the first lower-arm switch S1$n$ and the second lower-arm switch S2$n$ are alternately turned on once during the time period Tsw1 that is set to be two times greater than the switching cycle, i.e. switching period, Tsw for the high-load state of the voltage booster 10. In other words, each of the first lower-arm switch S1$n$ and the second lower-arm switch S2$n$ is turned on during the time period Tsw1 while the on duration of the first lower-arm switch S1$n$ and the on duration of the second lower-arm switch S2$n$ are non-overlapped with each other.

This enables the number of turn-on times, i.e. on durations, of each of the first and second lower-arm switches S1$n$ and S2$n$ during the low-load switching control to fall to half of the number of turn-on times, i.e. on durations, of a corresponding one of the first and second lower-arm switches S1$n$ and S2$n$ during the high-load switching control. This results in reduction of switching loss of the voltage booster 10 that is in the low-load state. Note that FIG. 4 illustrates the relationship between loss Eoff due to tail current caused when each switch S1$n$, S2$n$ is turned off and a collector current Ice flowing through the corresponding switch immediately before the turn-off of the corresponding switch.

Thereafter, at time t2, it is determined that the inductor current IL increases to become equal to or higher than the second threshold value $\alpha 2$ (see YES in step S16). This switches the determination flag F from 0 to 1, resulting in starting of the high-load switching control (see steps S12 and S13).

The power control system 100 according to the first embodiment achieves the following advantageous effects:

First, the ECU 40 is configured to perform the low-load switching control that turns on an alternate one of the first and second lower-arm switches S1$n$ and S2$n$ for each switching cycle Tsw when determining that the present state of the voltage booster 10 is in the low-load state. This configuration reduces the number of turn-on times, i.e. switching operations, of each of the first and second lower-arm switches S1$n$ and S2$n$ during the low-load switching control to half of the number of turn-on times, i.e. switching operations, of a corresponding one of the first and second lower-arm switches S1$n$ and S2$n$ during the high-load switching control. This results in reduction of switching loss of the voltage booster 10 that is in the low-load state.

Second, the ECU 40 is configured to alternately turn on the first and second lower-arm switches S1$n$ and S2$n$ for the same switching cycle Tsw. This configuration results in reduction of (1) Temperature variations between the first and second lower-arm switches S1$n$ and S2$n$ (2) Imbalance between age deterioration of the first lower-arm switch S1$n$ and age deterioration of the second lower-arm switch S2$n$.

Note that the ECU 40 is capable of executing the switching control routine illustrated in FIG. 2 when the voltage booster 10 is operating in the step-down mode using the first and second upper-arm switches S1$p$ and S2$p$ in place of the first and second lower-arm switches S1$n$ and S2$n$.

Second Embodiment

Figure 5:
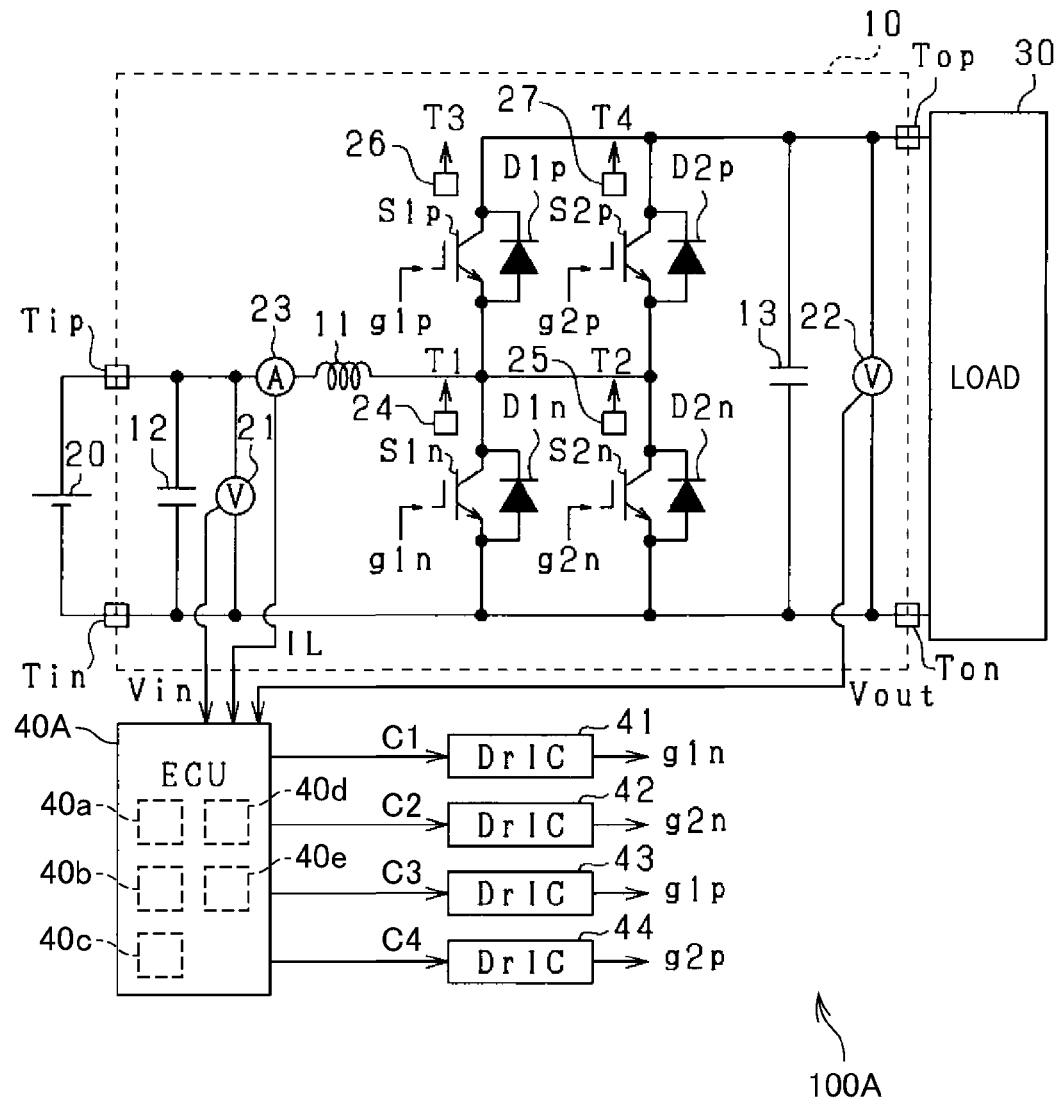
FIG. 5 is a circuit diagram schematically illustrating an example of the overall structure of a power control system according to the second embodiment of the present disclosure.

The following describes the configuration of a power control system 100A according to the second embodiment with reference to FIGS. 5 to 6E. The configuration and functions of the control system 100A according to the second embodiment are mainly different from those of the control system 100 according to the first embodiment by the following points. The following therefore mainly describes the different points while like reference numerals are assigned to like parts between the first and second embodiments.

The control system 100A further includes first to fourth temperature sensors 24 to 27 in addition to the structure of the control system 100.

The first temperature sensor 24 is provided close to the first lower-arm switch S1$n$, and operative to measure the temperature of the first lower-arm switch S1$n$. The first temperature sensor 24 is connected to an ECU 40A, and outputs the measured temperature to the ECU 40A as a first temperature T1.

The second temperature sensor 25 is provided close to the second lower-arm switch S2$n$, and operative to measure the temperature of the second lower-arm switch S2$n$. The second temperature sensor 25 is connected to the ECU 40A, and outputs the measured temperature to the ECU 40A as a second temperature T2.

The third temperature sensor 26 is provided close to the first upper-arm switch S1$p$, and operative to measure the temperature of the first upper-arm switch S1$p$. The third temperature sensor 26 is connected to the ECU 40A, and outputs the measured temperature to the ECU 40A as a third temperature T3.

The fourth temperature sensor 27 is provided close to the second upper-arm switch S2$p$, and operative to measure the temperature of the second upper-arm switch S2$p$. The fourth temperature sensor 27 is connected to the ECU 40A, and outputs the measured temperature to the ECU 40A as a fourth temperature T4.

For example, a temperature-sensitive diode or a thermistor can be used for each of the first to fourth temperature sensors 24 to 27.

The ECU 40A includes, in addition to the load determiner 40a, high-load controller 40b, and low-load controller 40a, a temperature obtainer 40d and a switch determiner 40e.

The temperature obtainer 40d obtains the first to fourth temperatures T1 to T4 output from the first to fourth temperature sensors 24 to 27.

The switch determiner 40e determines which of the first and second lower-arm switches S1n and S2n has the highest temperature in all the first and second lower-arm switches S1n and S2n using the first to fourth temperatures T1 to T4 obtained by the temperature obtainer 40d.

That is, the ECU 40A performs a modified switching control routine according to the second embodiment to change the on-off operations of each of the first and second lower-arm switches S1n and S2n in accordance with whether the state of the voltage booster 10 is determined to be in the high-load state or the low-load state.

That is, during execution of the low-load switching control, the low-load controller 40c controls on-off operations of the first and second lower-arm switches S1n and S2n. This control for example reduces the number of turn-on times of one of the first and second lower-arm switches S1n and S2n over a predetermined time interval as compared with the number of turn-on times of the other thereof when the temperature of one of the first and second lower-arm switches S1n and S2n is higher than the other thereof over the time interval.

Specifically, the ECU 40A provides a first temperature threshold Th1 and a second temperature threshold Th2 higher than the first temperature threshold Th1.

Figure 6A:
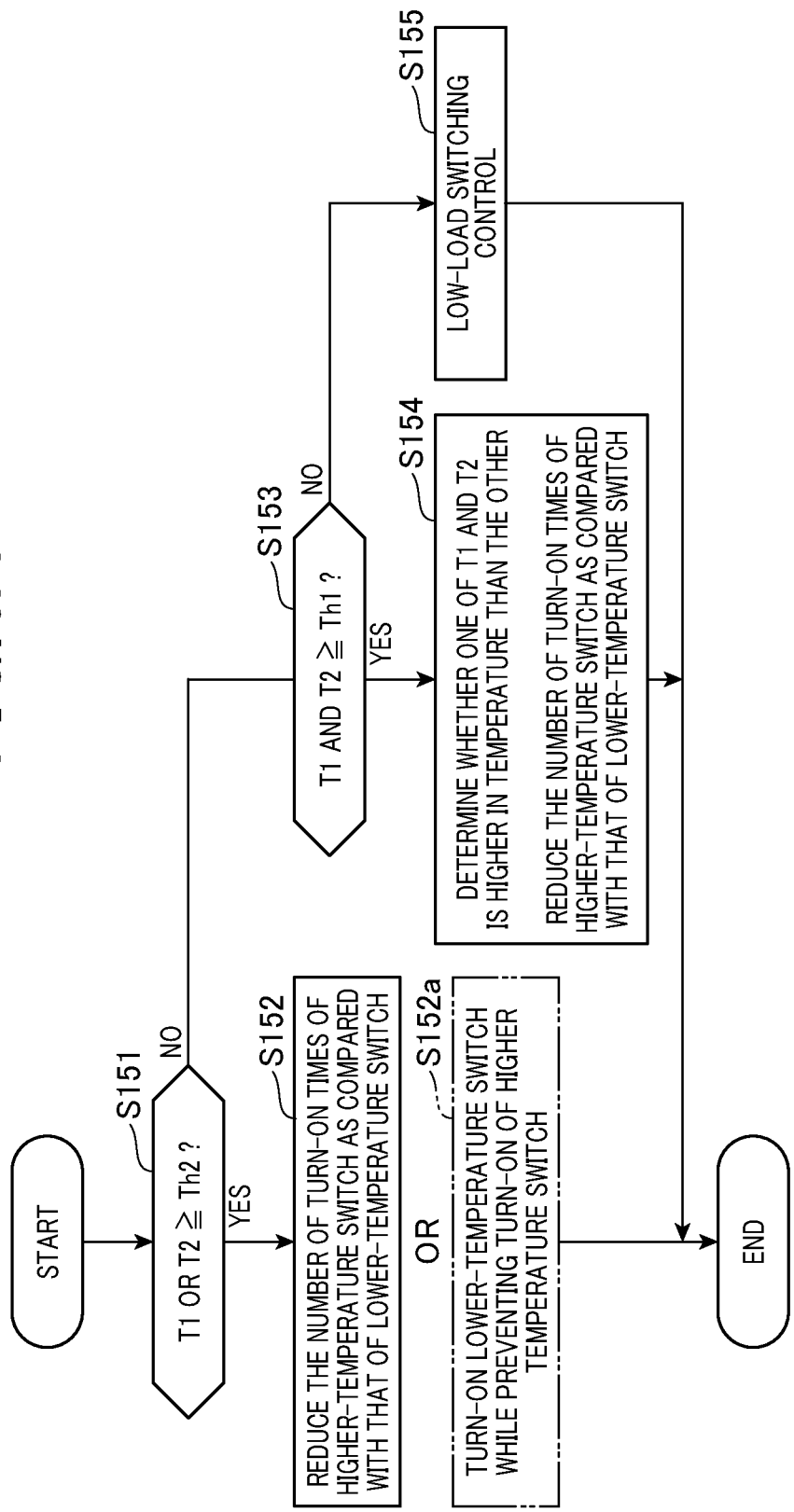
FIG. 6A is a flowchart schematically illustrating an example of a switching control routine carried out by an ECU illustrated in FIG. 5 according to the second embodiment.

During the low-load switching control in step S15, the ECU 40A serves as, for example, the switch determiner 40e to determine whether the first temperature T1 or the second temperature T2 is equal to or higher than the second temperature threshold Th2 in step S151 of FIG. 6A.

Upon determining that the first temperature T1 or the second temperature T2 is equal to or higher than the second temperature threshold Th2 (YES in step S151), the ECU 40A serves as, for example, the low-load controller 40c to perform the operation in step S152. In step S152, one of the switches S1n and S2n, which is higher in temperature than the other thereof will be referred to as a higher temperature switch, and the other thereof, which is lower in temperature than the higher temperature switch will be referred to as a lower temperature switch.

Specifically, the ECU 40A reduces the number of turn-on times of the higher temperature switch over a predetermined time interval as compared with the number of turn-on times of the lower temperature switch over the time interval while any one of the higher and lower temperature switches S1n and S2n is turned on for each switching cycle Tsw in step S152. The time interval is for example set to a time interval from when the temperature of the higher temperature switch is determined to be equal to or higher than the second temperature threshold Th2 to when the temperature of the higher temperature switch is determined to be lower than the first temperature threshold Th1.

Otherwise, upon determining that the first temperature T1 and the second temperature T2 are lower than the second temperature threshold Th2 (NO in step S151), the ECU 40A determines whether the first temperature T1 and the second temperature T2 are equal to or higher than the first temperature threshold Th1 in step S153.

Upon determining that the first temperature T1 and the second temperature T2 are equal to or higher than the first temperature threshold Th1 (YES in step S153), the ECU 40A carries out the operation in step S154. Specifically, the ECU 40A determines whether one of the first and second lower-arm switches S1n and S2n is higher in temperature than the other thereof in step S154. In step S154, one of the switches S1n and S2n, which is higher in temperature than the other thereof will be referred to as a higher temperature switch, and the other thereof, which is lower in temperature than the higher temperature switch will be referred to as a lower temperature switch.

Then, in step S154, the ECU 40A reduces the number of turn-on times of the higher temperature switch over the time interval as compared with the number of turn-on times of the lower temperature switch over the time interval while any one of the higher and lower temperature switches S1n and S2n is turned on for each switching cycle Tsw.

Otherwise, upon determining that at least one of the first temperature T1 and the second temperature T2 is lower than the first temperature threshold Th1 (NO in step S153), the ECU 40A performs the low-load switching control in the same manner as the first embodiment in step S155. That is, the ECU 40A causes the first and second drivers 41 and 42 to turn on an alternate one of the first and second lower-arm switches S1n and S2n for each switching cycle Tsw in step S155.

FIGS. 6B to 6D schematically illustrate an example of the low-load switching control according to the second embodiment when the ECU 40A performs the operation in step S152 while the voltage booster 10 is operating in the step-up mode.

FIG. 6B illustrates how the drive signal g1n changes, i.e. how the corresponding first lower-arm switch S1n is driven. FIG. 6C illustrates how the drive signal g2n changes, i.e. how the corresponding second lower-arm switch S2n is driven. FIG. 6D illustrates how the second temperature T2 changes. Note that the first temperature T1, which changes while being lower than the second temperature T2, is unillustrated in FIG. 6D.

The example of the switching control illustrated in FIGS. 6B to 6D shows that the low-load switching control in the same manner as the first embodiment is carried out before time t11.

At the time t11, FIG. 6C shows that the second temperature T2 increases to be equal to or higher than the second temperature threshold Tth2. Then, it is determined that the second temperature T2 is equal to or higher than the second temperature threshold Th2 in step S151. This results in execution of the operation in step S152.

Specifically, the number of switching operations of the second lower-arm switch S2n over the time interval is set to be lower than the number of switching operations of the first lower-arm switch S1n over the time interval while any one of the first and second lower-arm switches S1n and S2n is turned on for each switching cycle Tsw (see step S152).

FIGS. 6B to 6D show that the time interval is for example set to be three times the switching cycle Tsw, so that the time interval is equal to the time interval from the time t11 to time t11a inclusive. That is, FIGS. 6B and 6C show that the lower temperature switch S1n is turned on twice during the time interval from the time t11 to the time t11a, and the higher temperature switch S2n is turned on once during the time interval from the time t11 to the time t11a while the switches S1n and S2n are prevented from being simultaneously turned on for each switching cycle Tsw.

At time t12 after the time t11a, when the second temperature T2 becomes equal to or lower than the first temperature threshold Tth1, the ECU 40 shifts the low-load control according to the second embodiment to the low-load control according to the first embodiment.

FIGS. 7A to 7C schematically illustrate an example of the low-load switching control according to the second embodiment when the ECU 40A performs the operation in step S154 while the voltage booster 10 is operating in the step-up mode. FIGS. 7A to 7C correspond to the respective FIGS. 6B to 6D.

Specifically, at time t11, when it is determined that the first and second temperatures T1 and T2 are lower than the second threshold Tth2 (NO in step S151), and the first and second temperatures T1 and T2 are equal to or higher than the first temperature threshold Th1 (YES in step S154), the ECU 40A carries out the operation in step S154.

At the time t11, it is determined that the second lower-arm switch S2n is higher in temperature than the first lower-arm switch S1n in step S154.

Then, the lower temperature switch S1n is continuously turned on at the time t11, but the higher temperature switch S2n is kept off at the time t11.

At time t12 after lapse of the switching cycle Tsw since the time t11, the lower temperature switch S1n is continuously turned on, and the higher temperature switch S2n is kept off, because it is determined that the second lower-arm switch S2n is higher in temperature than the first lower-arm switch S1n at the time t12 in step S154.

On the other hand, at time t13 after lapse of the switching cycle Tsw since the time t12, it is determined that the first lower-arm switch S1n is higher in temperature than the second lower-arm switch S2n. For this reason, at the time t13, the higher temperature switch S1n is kept off, and the lower temperature switch S2n is turned on.

At time t14 after lapse of the switching cycle Tsw since the time t13, it is determined that the second lower-arm switch S2n is higher in temperature than the first lower-arm switch S1n. For this reason, at the time t14, the higher temperature switch S2n is kept off, and the lower temperature switch S1n is turned on.

At time t15 after lapse of the switching cycle Tsw since the time t14, it is determined that the second lower-arm switch S2n is higher in temperature than the first lower-arm switch S1n. For this reason, at the time t15, the higher temperature switch S2n is kept off, and the lower temperature switch S1n is turned on.

Additionally, at the time t11, when it is determined that at least one of the first and second temperatures T1 and T2 is lower than the first temperature threshold Th1 (NO in step S153), the ECU 40A carries out the operation in step S155. This leads to execution of the low-load switching control in the same manner as the first embodiment.

As described above, the ECU 40A according to the second embodiment is configured to reduce the number of switch-on times of one of the first and second lower-arm switches S1n and S2n, which is higher in temperature than the other thereof, as compared with the number of switch-on times of the other thereof in the low-load switching control. This configuration results in reduction of temperature variations between the first and second lower-arm switches S1n and S2n.

The ECU 40A according to the second embodiment is also configured to ensure any one of the first and second lower-arm switches S1n and S2n for each switching cycle Tsw while reducing the number of turn-on times of the higher temperature switch as compared with the number of turn-on times of the lower temperature switch. This configuration enables sufficient power output from the voltage booster 10 to be maintained in comparison to power that should be output from the voltage booster 10 while limiting the number of turn-on times of the higher temperature switch.

The time interval over which the number of turn-on times of the high temperature switch is lower than the number of turn-on times of the low temperature switch is set to be three times the switching cycle Tsw according to the second embodiment, but the present disclosure is not limited thereto. Specifically, the time interval over which the number of turn-on times of the high temperature is lower than the number of turn-on times of the low temperature switch can be set to be N times the switching cycle Tsw where N is an integer equal to or more than 4.

In this modification, the lower temperature switch is turned on (N−1) times during the time interval, and the higher temperature switch is turned on once during the time interval while the high and low temperature switches are prevented from being simultaneously turned on for each switching cycle Tsw.

Note that the ECU 40A is capable of executing the switching control routine illustrated in FIGS. 2 and 6A according to the second embodiment when the voltage booster 10 is operating in the step-down mode using the first and second upper-arm switches S1p and S2p in place of the first and second lower-arm switches S1n and S2n.

Third Embodiment

The following describes the configuration of a power control system according to the third embodiment with reference to FIGS. 8A to 8C and FIGS. 9A to 9C. FIGS. 8A to 8C respectively correspond to FIGS. 6B to 6D, and FIGS. 9A to 9C respectively correspond to FIGS. 6B to 6D.

The configuration and functions of the control system according to the third embodiment are mainly different from those of the control system 100A according to the second embodiment by the following points. The following therefore mainly describes the different points while like reference numerals are assigned to like parts between the first and third embodiments.

The low-load switching control and the high-load switching control according to the third embodiment are modified based on the first and second temperatures T1 and T2 measured by the respective first and second temperature sensors 24 and 25

During execution of the low-load switching control in step S15, the ECU 40A determines whether the first temperature T1 or the second temperature T2 is equal to or higher than the second temperature threshold Th2 in step S151 of FIG. 6A.

Upon determining that the first temperature T1 or the second temperature T2 is equal to or higher than the second temperature threshold Th2 (YES in step S151), the ECU 40A serves as, for example, the low-load controller 40c to perform the operation in step S152a (see chain double-dashed line in FIG. 6A) in place of the operation in step S152.

In step S152a, one of the switches S1n and S2n, which is higher in temperature than the other thereof will be referred to as a higher temperature switch, and the other thereof, which is lower in temperature than the higher temperature switch will be referred to as a lower temperature switch.

Specifically, the ECU 40A turns on the lower temperature switch for each switching cycle Tsw while preventing turn-on of the higher temperature switch, that is, maintaining the higher temperature switch in an off state in step S152a.

The ECU 40A continuously performs the operation in step S152a until the temperature of the high temperature switch becomes equal to or lower than the first temperature threshold Tth1.

FIGS. 8A to 8C schematically illustrate an example of the low-load switching control according to the third embodiment while the voltage booster 10 is operating in the step-up mode.

The example of the switching control illustrated in FIGS. 8A to 8C shows that the low-load switching control in the same manner as the first embodiment is carried out before time t21.

At the time t21, FIG. 8C shows that the second temperature T2 increases to be equal to or higher than the second temperature threshold Tth2. Then, it is determined that the second temperature T2 is equal to or higher than the second temperature threshold Th2 in step S151. This results in execution of the operation in step S152a.

Specifically, the lower temperature switch is turned on for each switching cycle Tsw while turn-on of the higher temperature switch is prevented.

The operation in step S152a is continuously performed until the temperature of the high temperature switch becomes equal to or lower than the first temperature threshold Tth1.

In addition, during execution of the high-load switching control in step S13, the ECU 40A determines whether the first temperature T1 or the second temperature T2 is equal to or higher than the second temperature threshold Th2 in step S151 of FIG. 6A.

Upon determining that the first temperature T1 or the second temperature T2 is equal to or higher than the second temperature threshold Th2 (YES in step S151), the ECU 40A carries out the operation in step S152a (see chain double-dashed line in FIG. 6A).

In step S152a, one of the switches S1n and S2n, which is higher in temperature than the other thereof will be referred to as a higher temperature switch, and the other thereof, which is lower in temperature than the higher temperature switch will be referred to as a lower temperature switch.

Specifically, the ECU 40A turns on the lower temperature switch for each switching cycle Tsw while preventing turn-on of the higher temperature switch, that is, maintaining the higher temperature switch in an off state in step S152a.

The ECU 40A continuously performs the operation in step S152a until the temperature of the high temperature switch becomes equal to or lower than the first temperature threshold Tth1.

FIGS. 9A to 9C schematically illustrate an example of the high-load switching control according to the third embodiment while the voltage booster 10 is operating in the step-up mode.

The example of the switching control illustrated in FIGS. 9A to 9C shows that the high-load switching control in the same manner as the first embodiment is carried out before time t31.

At the time t31, FIG. 8C shows that the second temperature T2 increases to be equal to or higher than the second temperature threshold Tth2. Then, it is determined that the second temperature T2 is equal to or higher than the second temperature threshold Th2 in step S151. This results in execution of the operation in step S152a.

Specifically, the lower temperature switch is turned on for each switching cycle Tsw while turn-on of the higher temperature switch is prevented.

This enables sufficient power output from the voltage booster 10 to be maintained in comparison to power that should be output from the voltage booster 10 while limiting the number of turn-on times of the higher temperature switch.

The operation in step S152a is continuously performed until the temperature of the high temperature switch becomes equal to or lower than the first temperature threshold Tth1.

As described above, the ECU 40A according to the third embodiment enables sufficient power output from the voltage booster 10 to be maintained in comparison to power that should be output from the voltage booster 10 while limiting the number of turn-on times of the higher temperature switch during execution of each of the low-load switching control and the high-load switching control.

Note that the ECU 40A is capable of executing the switching control routine illustrated in FIGS. 2 and 6A according to the third embodiment when the voltage booster 10 is operating in the step-down mode using the first and second upper-arm switches S1p and S2p in place of the first and second lower-arm switches S1n and S2n.

Fourth Embodiment

Figure 10:
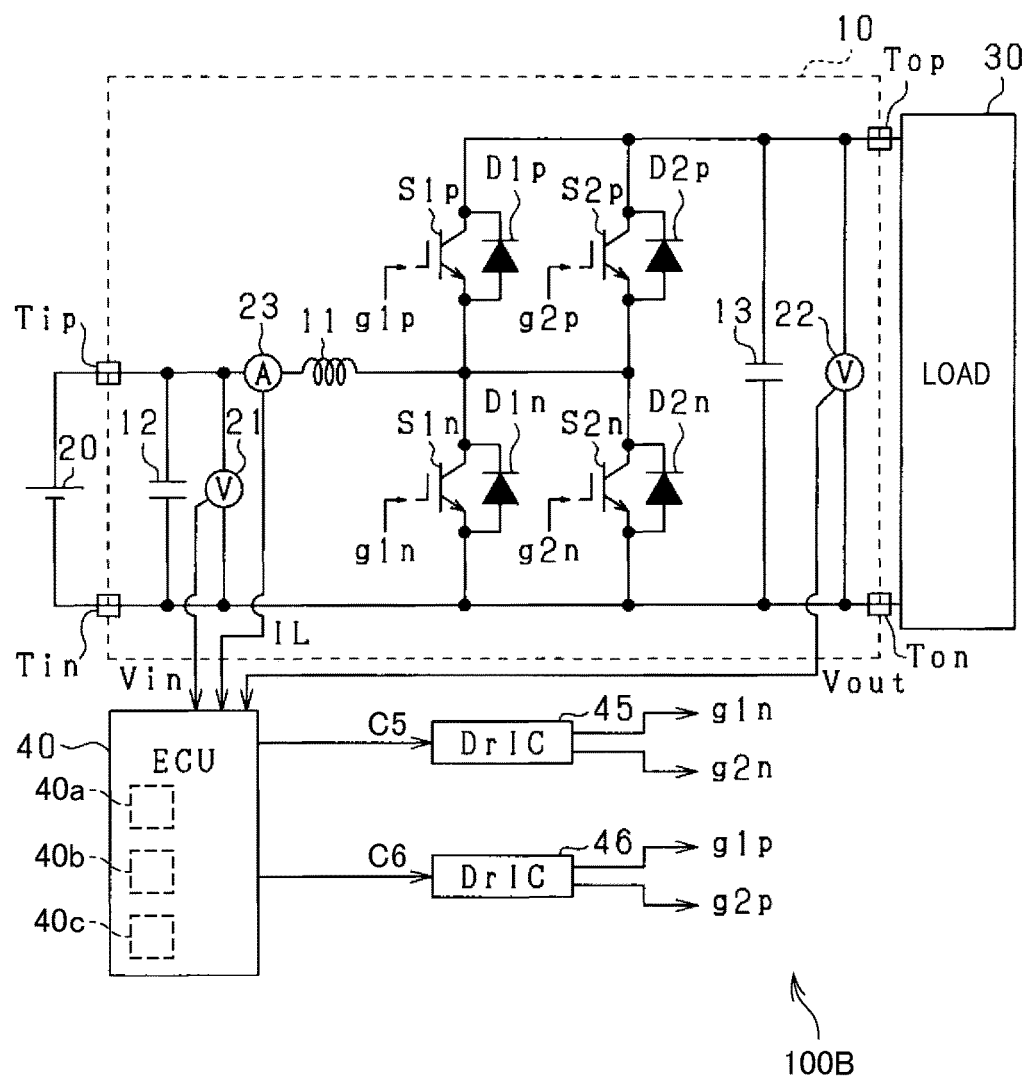
FIG. 10 is a circuit diagram schematically illustrating an example of the overall structure of a power control system according to the fourth embodiment of the present disclosure.

The following describes the configuration of a power control system 100B according to the fourth embodiment with reference to FIGS. 10 to 11C. The configuration and functions of the control system 100B according to the fourth embodiment are mainly different from those of the control system 100 according to the first embodiment by the following points. The following therefore mainly describes the different points while like reference numerals are assigned to like parts between the first and fourth embodiments.

The control system 100B includes a first drive unit 45 provided for the first and second lower-am switches S1n and S2n, and a second drive unit 46 provided for the first and second upper-arm switches S1p and S2p. Each of the first and second drive units 45 and 46 is comprised of an IC.

The ECU 40 generates a single command signal, i.e. a common command signal, C5 for each of the first and second lower-arm switches S1n and S2n based on the determined duty Duty of a corresponding one of the first and second lower-arm switches S1n and S2n. Then, the ECU 40 outputs the common command signal C5 to the first drive unit 45.

The ECU 40 also generates a single command signal, i.e. a common command signal, C6 for each of the first and second upper-arm switches S1p and S2p based on the determined duty Duty of a corresponding one of the first and second lower-arm switches S1n and S2n. Then, the ECU 40 outputs the command signal C6 to the second drive unit 46.

The first drive unit 45 generates drive signals g1n and g2n based on the command signal C5, and outputs the drive signals g1n and g2n to the respective first and second lower-arm switches S1n and S2n, thus controlling on-off operations of the respective first and second lower-arm switches S1n and S2n.

The second drive unit 46 generates drive signals g1p and g2p based on the command signal C6, and outputs the drive signals g1p and g2p to the respective first and second upper-arm switches S1p and S2p, thus controlling on-off operations of the respective first and second upper-arm switches S1p and S2p.

Each of the first and second drive units 45 and 46 is operative to measure at least one of currents flowing in the voltage booster 10 without the ECU 40 for measuring an overcurrent flowing in the voltage booster 10.

For example, each of the first and second drive units 45 and 46 is operative to measure a current flowing through the inductor 11 or flowing through at least one of the first and second lower-arm switches S1n and S2n.

FIGS. 11A to 11C illustrate an example of how the first drive unit 45 generates the drive signals g1n and g2n based on the command signal C5 output from the ECU 40 during execution of the low-load switching control.

Specifically, FIG. 11A illustrates how the command signal C5 output from the ECU 40 changes, and each of FIGS. 11B and 11C illustrates how a corresponding one of the drive signals g1n and g2n output from the first drive unit 45 changes.

FIG. 11A shows that the ECU 40 outputs the command signal C5 having an alternate one of a determined duty Duty 1 of the first lower-arm switch S1n and a determined duty Duty 2 of the second lower-arm switch S2n for each switching cycle Tsw.

FIGS. 11B and 11C show that the first drive unit 45 is configured to alternately generate the drive signal g1n and the drive signal g2n for each switching cycle Tsw based on the command signal C5.

Additionally, the first drive unit 45 is operative to perform, for example, the operation in each of steps S11 and S16 according to the current measured thereby, thus determining whether the voltage booster 10 is in the low-load state or the high-load state. Then, the first drive unit 45 is operative to perform the operations in steps S12 to S15 according to the executed results of a corresponding one of the operations in steps S11 and S16.

That is, the power control system 100B according to the fourth embodiment enables the number of the drive units to be reduced to half of the number of upper- and lower-arm switches S1p, S1n, S2p, and S2n. This downsizes the power control system 100B.

Additionally, functionally changing a commercially available drive unit for voltage-controlled switches enables the commercially available drive unit to serve as the first drive unit 45 for performing the switching control routine illustrated in FIG. 2 without modifying the ECU 40 itself, i.e. the software programs stored in the microcomputer circuit of the ECU 40.

The present disclosure is not limited to the aforementioned embodiments, and can be modified within the scope thereof.

The ECU 40 according to the first embodiment is configured to alternately turn on the first and second lower-arm switches S1n and S2n for each of the switching cycle Tsw in the low-load switching control, but the present disclosure is not limited thereto. Specifically, the ECU 40 can be configured to continuously turn on plural times of an alternate one of the first and second lower-arm switches S1n and S2n for corresponding plural switching cycles Tsw as illustrated in FIGS. 12A and 12B. Note that FIGS. 12A and 12B show that the ECU 40 is configured to continuously turn on two times of an alternate one of the first and second lower-arm switches S1n and S2n for corresponding two switching cycles Tsw.

The voltage booster 10 according to each embodiment includes two lower-arm switches S1n and S2n, but the voltage booster 10 can include three or more lower-arm switches.

Figure 13:
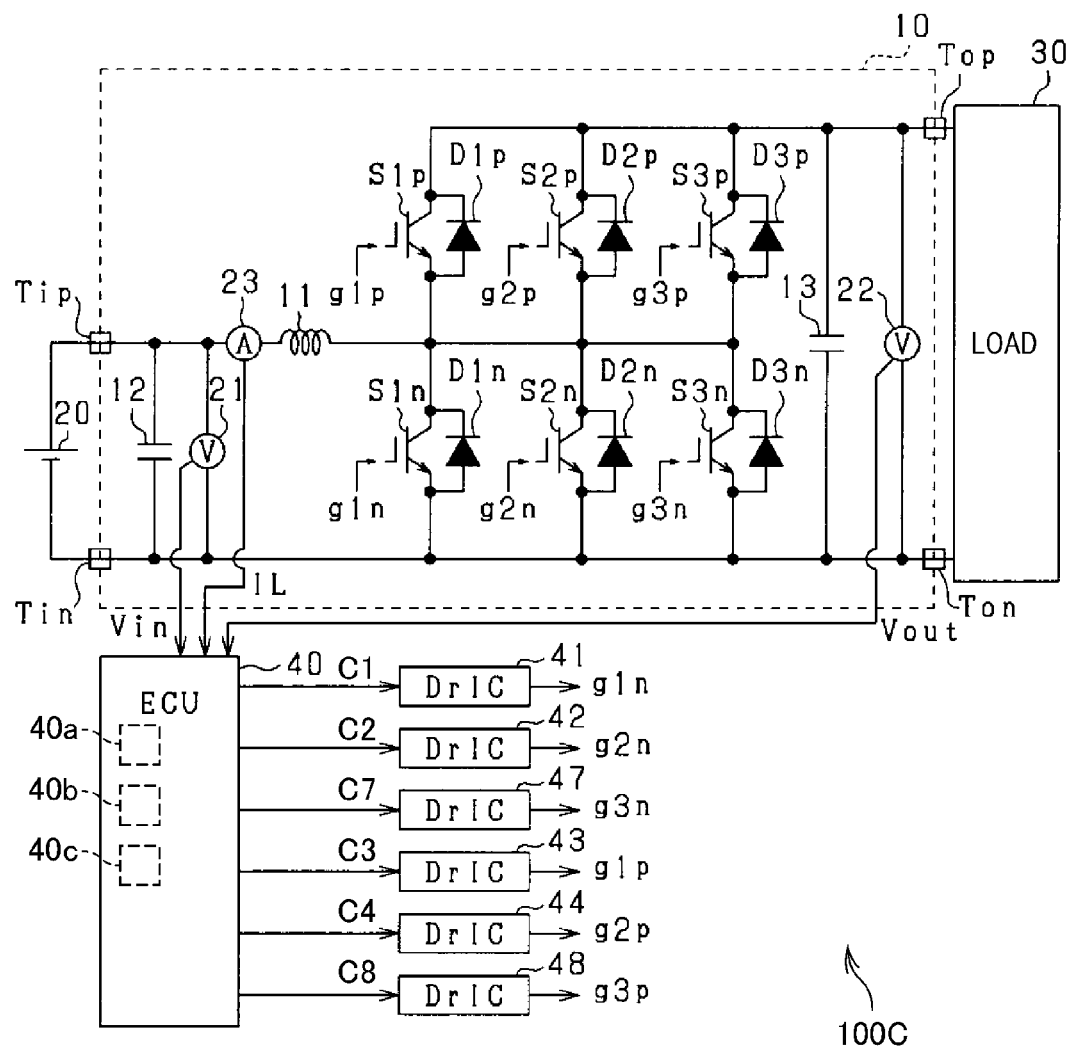
FIG. 13 is a circuit diagram schematically illustrating an example of the overall structure of a power control system according to another modification of the first embodiment.

FIG. 13 schematically illustrates a power control system 100C, which includes a voltage booster 10A including three lower-arm switches, according to a modification of the first embodiment. Like reference numerals are assigned to like parts between FIGS. 1 and 13.

The voltage booster 10A of the power control system 100C further includes a third pair of a third upper-arm switch S3p and a third lower-arm switch S3n connected in series to each other. The voltage booster 10A also includes free-wheel diodes or flywheel diodes D3p and D3n connected in antiparallel to the respective switches S3p and S3n.

The connection point between the third upper- and lower-arm switches S3p and S3n is connected to the second end of the inductor 11.

The collectors of the first to third upper-arm switches S1p to S3p are connected to the positive output terminal Top of the voltage booster 10A. The emitters of the first to third lower-arm switches S1n to S3n are connected to the negative output terminal Ton of the voltage booster 10A.

The power control system 100C also includes fifth and sixth drivers 47 and 48 provided for the third lower- and upper-arm switches S3n and S3p, each of which is comprised of an IC.

The ECU 40 determines the duty Duty of the third lower-arm switch S3n and S2n as a function of the input voltage Vin, the output voltage Vout, and the inductor current IL when controlling the voltage booster 10A to operate in the booster mode. Then, the ECU 40 generates command signals C7 and C8 for the respective switches S3n and S3p based on the determined duty Duty of the third lower-arm switching element S3n in addition to the command signals C1 to C4.

The fifth driver 47 generates a drive signal g3n based on the command signal C7, and outputs the drive signal g3n to the third lower-arm switch S3n, thus controlling on-off operations of the third lower-arm switch S3n.

The sixth driver 48 generates a drive signal g3p based on the command signal C8, and outputs the drive signal g3p to the third upper-arm switch S3p, thus controlling on-off operations of the third upper-arm switch S3p.

FIGS. 14A to 14D schematically illustrate an example of switching control of the first to third lower-arm switches S1n to S3n in accordance with execution of the switching control routine illustrated in FIG. 2. FIG. 14A illustrates how the drive signal g1n changes, i.e. how the corresponding first lower-arm switch S1n is driven. FIG. 14B illustrates how the drive signal g2n changes, i.e. how the corresponding second lower-arm switch S2n is driven. FIG. 14C illustrates how the drive signal g3n changes, i.e. how the corresponding third lower-arm switch S3n is driven. FIG. 14D illustrates how the determination flag F changes.

The example of the switching control illustrated in FIGS. 14A to 14D shows that the high-load switching control is carried out before time t41.

At the time t41, the inductor current IL decreases to be equal to or lower than the first threshold value $\alpha 1$. Thus, it is determined that the inductor current IL is equal to or lower than the first threshold value $\alpha 1$ at the time t41 (see YES in step S11), so that the determination flag F is switched from 1 to 0 (see step S14). This leads to starting the low-load switching control (see step S15).

Specifically, the first, second, and third lower-arm switches S1n, S2n, and S3n are alternately turned on while a switching cycle, i.e. a time period, Tsw2 for each of the switches S1n, S2n, and S3n is set to be three times greater than the switching cycle Tsw for the high-load state of the voltage booster 10A. In other words, each of the first to third lower-arm switches S1n to S3n is turned on during the time period Tsw2 while the on durations of the respective switches S1n to S3n are non-overlapped with each other.

This enables the number of turn-on times of each of the first to third lower-arm switches S1n to S3n during the low-load switching control to fall to one-third of the number of turn-on times of a corresponding one of the first to third lower-arm switches S1n to S3n during the high-load switching control. This results in reduction of switching loss of the voltage booster 10A that is in the low-load state.

FIGS. 15A to 15D schematically illustrate another example of switching control of the first to third lower-arm switches S1n to S3n of the voltage inverter 10A illustrated in FIG. 13 in accordance with execution of the switching control routine illustrated in FIG. 2. FIGS. 15A to 15D respectively correspond to FIGS. 14A to 14D.

The example of the switching control illustrated in FIGS. 15A to 15D shows that the high-load switching control is carried out before time t51.

At the time t51, the inductor current IL decreases to be equal to or lower than the first threshold value al. Thus, it is determined that the inductor current IL is equal to or lower than the first threshold value al at the time t51 (see YES in step S11), so that the determination flag F is switched from 1 to 0 (see step S14). This leads to starting the low-load switching control (see step S15).

In step S15, the ECU 40 or 40A is configured to sequentially turn on the first lower-arm switch S1n and third lower-arm switch S3n for the respective successive switching cycles Tsw while maintaining the second lower-arm switch S2n in the off state.

Let us assume that the voltage booster 10A according to the modification illustrated in FIG. 12 is applied to the control system 100A according to the third embodiment. In this assumption, the ECU 40A alternately turns on one of two of the first to third lower-arm switches for each switching cycle Tsw while preventing turn-on of the remaining switch that has the highest temperature in all the first to third lower-arm switches S1n to S3n.

The ECU 40 or 40A according to each embodiment is configured to determine whether the voltage booster 10 is in the high-load state or the low-load state as a function of the inductor current IL, but the present disclosure is not limited thereto. Specifically, the ECU 40 or 40A can be configured to multiply the output voltage Vout by the inductor current IL to calculate power, and determine whether the voltage booster 10 is in the high-load state or the low-load state as a function of the calculated power.

The voltage booster 10 or 10A according to each embodiment is provided with the same number of upper-arm switches and lower-arm switches, but the number of upper-arm switches can be lower than the number of lower-arm switches.

The voltage booster 10 or 10A according to each embodiment can be provided with no upper-arm switches. This modification enables each of the upper-am diodes provided in the voltage booster 10 or 10A to serve as an upper-arm rectifier to boost the input voltage Vin and output the boosted input voltage as the output voltage Vout.

The current sensor 23 can be configured to measure a current flowing through one of the lower-arm switches in place of the inductor current IL. In this modification, the ECU 40 can be configured to perform the switching control routine illustrated in FIG. 2 using the measured current in place of the inductor current IL.

The voltage booster 10 or 10A according to each embodiment can be provided with a plurality of inductors for example connected in parallel to each other.

The ECU 40 or 40A according to each embodiment can be configured to perform the high-load switching control and low-load switching control for the upper-arm switches of the voltage booster 10 or 10A in place of the lower-arm switches in the same manner as the lower-arm switches set forth above.

As described above, MOSFETs can be used as the respective switches of the voltage booster 10 or 10A according to each embodiment.

While the illustrative embodiments and their modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control device for a power converter, comprising:
a first set of a plurality of first rectifiers;
a second set of a plurality of second rectifiers connected to respective first rectifiers in series, each of the first rectifiers of the first set being comprised of a switch, the control device being configured to control on-off operations of the first rectifiers to convert power input to the power converter from a direct-current power source into controlled power as output power from the power converter to an electrical load;
a load determiner configured to determine whether the power converter is in a high-load state or a low-load state, the high-load state being where the output power from the power converter is not less than a predetermined level, the low-load state being where the output power from the power converter is less than the output power from the power converter in the high-load state;
a high-load controller configured to control on-off operations of the first rectifiers such that on durations of the first rectifiers are respectively synchronized with each other when it is determined that the power converter is in the high-load state; and
a low-load controller configured to control on-off operations of the first rectifiers to reduce the on durations of the first rectifiers synchronized with each other when it is determined that the power converter is in the low-load state.

2. The control device according to claim 1, wherein:
a predetermined time period is a product of a number of the first rectifiers and a switching period of each of the first rectifiers, and
the low-load controller is configured to control on-off operations of each of the first rectifiers to turn on a corresponding one of the first rectifiers once during the predetermined time period.

3. The control device according to claim 2, further comprising:
a temperature obtaining unit configured to obtain a temperature of each of the first rectifiers; and
a switch determiner configured to determine which of the first rectifiers is a highest-temperature switch having the highest temperature of all the first rectifiers based on the obtained temperature of each of the first rectifiers,
wherein the low-load controller is configured to reduce a number of on times of the highest-temperature switch over a predetermined time interval as compared with a number of on times of each remaining first switch over the predetermined time interval while turning on at least one of the first switches for each switching cycle.

4. The control device according to claim 1, further comprising:
a temperature obtaining unit configured to obtain a temperature of each of the first rectifiers; and
a switch determiner configured to determine which of the first rectifiers is a highest-temperature switch having the highest temperature of all the first rectifiers based on the obtained temperature of each of the first rectifiers,
wherein the low-load controller is configured to reduce a number of on times of the highest-temperature switch over a predetermined time interval as compared with a number of on times of each remaining first switch over the predetermined time interval while turning on at least one of the first switches for each switching cycle.

5. The control device according to claim 4, wherein the low-load controller is configured to control on-operations of the highest-temperature switch to turn on the highest-temperature switch at least once over the predetermined time interval.

6. The control device according to claim 4, wherein the low-load controller is configured to prevent turn-on of the highest-temperature switch over the predetermined time interval.

7. The control device according to claim 6, wherein the high-load controller is configured to prevent turn-on of the highest-temperature switch over the predetermined time interval while turning on at least one of the first switches for each switching cycle.

8. The control device according to claim 1, wherein the load determiner is configured to determine whether the power converter is in the high-load state or the low-load state based on a current flowing through at least one first rectifier during at least one of the on durations of the at least one first rectifier.

9. The control device according to claim 1, further comprising:
a driver commonly provided for the first rectifiers and configured to turn on or off the respective first rectifiers,
wherein a predetermined time period is a product of a number of the first rectifiers and a switching period of each of the first rectifiers,
the low-load controller is configured to output, to the driver, a common command signal for turning on each of the first rectifiers once during the predetermined time period, and
the driver is configured to turn on each of the first rectifiers once during the predetermined time period in response to the common command signal.

10. The control device according to claim 1, wherein each of the first rectifiers is comprised of a lower-arm switch, and each of the second rectifiers is comprised of an upper-arm switch connected in series to a corresponding one of the lower-arm switches.

* * * * *